United States Patent
Haggar et al.

(10) Patent No.: US 9,336,485 B2
(45) Date of Patent: May 10, 2016

(54) DETERMINING ANSWERS IN A QUESTION/ANSWER SYSTEM WHEN ANSWER IS NOT CONTAINED IN CORPUS

(71) Applicant: International Business Machines Corporation, Armonk, NY (US)

(72) Inventors: Peter F. Haggar, Raleigh, NC (US); Dane A. Johnson, Townsend, MA (US); Stephan J. Roorda, Fuquay-Varina, NC (US); Richard L. Stillwell, Austin, TX (US); Michael D. Whitley, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/914,906

(22) Filed: Jun. 11, 2013

(65) Prior Publication Data
US 2014/0365502 A1    Dec. 11, 2014

(51) Int. Cl.
*G06F 17/30* (2006.01)
*G06N 5/02* (2006.01)

(52) U.S. Cl.
CPC ............ *G06N 5/02* (2013.01); *G06F 17/30684* (2013.01)

(58) Field of Classification Search
None
See application file for complete search history.

(56) References Cited

U.S. PATENT DOCUMENTS

| 8,788,524 | B1 * | 7/2014 | Wolfram et al. | 707/779 |
| 2002/0103837 | A1 * | 8/2002 | Balchandran | G06F 17/274 715/264 |
| 2006/0184517 | A1 * | 8/2006 | Anderson et al. | 707/3 |
| 2009/0287678 | A1 | 11/2009 | Brown et al. | |
| 2009/0292687 | A1 | 11/2009 | Fan et al. | |
| 2011/0066587 | A1 | 3/2011 | Ferrucci et al. | |
| 2011/0125734 | A1 | 5/2011 | Duboue et al. | |
| 2011/0320187 | A1 | 12/2011 | Motik et al. | |
| 2012/0077178 | A1 * | 3/2012 | Bagchi et al. | 434/362 |
| 2012/0078890 | A1 * | 3/2012 | Fan | G09B 7/00 707/723 |
| 2012/0301864 | A1 | 11/2012 | Bagchi et al. | |
| 2013/0007055 | A1 | 1/2013 | Brown et al. | |
| 2013/0018652 | A1 | 1/2013 | Ferrucci et al. | |
| 2013/0031082 | A1 * | 1/2013 | Wolfram et al. | 707/706 |
| 2013/0066886 | A1 | 3/2013 | Bagchi et al. | |
| 2013/0144890 | A1 * | 6/2013 | Liu | 707/749 |
| 2014/0006012 | A1 * | 1/2014 | Zhou et al. | 704/9 |
| 2014/0075410 | A1 * | 3/2014 | Wolfram | 717/106 |

OTHER PUBLICATIONS

"WolframAlpha: Computational Knowledge Engine", www.wolframalpha.com, accessed on Mar. 25, 2013, 1 page.
High, Rob, "The Era of Cognitive Systems: An Inside Look at IBM Watson and How it Works", IBM Corporation, http://ip.com/pdf/redbook/REDP495500.pdf, 2012, 16 pages.
Yuan, Michael J. , "Watson and healthcare", IBM Corporation, developerWorks, http://www.ibm.com/developerworks/industry/library/ind-watson/, Apr. 12, 2011, pp. 1-14.

* cited by examiner

*Primary Examiner* — Alicia Willoughby
(74) *Attorney, Agent, or Firm* — Stephen J. Walder, Jr.; Reza Sarbakhsh

(57) ABSTRACT

Mechanisms are provided for generating an answer for an input question when the answer is not directly present in a corpus of information. An input question is received from a computing device and analyzed to determine whether the input question is requesting an answer that is calculable. In response to a determination that the input question is requesting an answer that is calculable, one or more constituent data values are retrieved, from a corpus of information, for calculating the requested answer to the input question. A value corresponding to the requested answer is calculated based on the one or more retrieved constituent data values and is then output as the requested answer to the input question.

12 Claims, 6 Drawing Sheets

400

```
┌─────────────────────────────────────────────────────────────┐
│ IMPORT A DOCUMENT HAVING A SET OF QUESTIONS BASED ON THE    │
│ CONTENT OF THE DOCUMENT                                      │
│ 405                                                          │
└─────────────────────────────────────────────────────────────┘
                              │
                              ▼
┌─────────────────────────────────────────────────────────────┐
│ AUTOMATICALLY CREATE A CANDIDATE QUESTION FROM THE CONTENT  │
│ 410                                                          │
└─────────────────────────────────────────────────────────────┘
                              │
                              ▼
┌─────────────────────────────────────────────────────────────┐
│ AUTOMATICALLY GENERATE ANSWERS FOR THE SET OF QUESTIONS AND │
│ CANDIDATE QUESTION USING THE CONTENT                         │
│ 415                                                          │
└─────────────────────────────────────────────────────────────┘
                              │
                              ▼
┌─────────────────────────────────────────────────────────────┐
│ PRESENT THE SET OF QUESTIONS, CANDIDATE QUESTION, AND       │
│ ANSWERS TO THE CONTENT CREATOR FOR VERIFICATION              │
│ 420                                                          │
└─────────────────────────────────────────────────────────────┘
                              │
                              ▼
┌─────────────────────────────────────────────────────────────┐
│ STORE THE VERIFIED SET OF QUESTIONS IN THE DOCUMENT         │
│ 425                                                          │
└─────────────────────────────────────────────────────────────┘
```

FIG. 4

DETERMINING ANSWERS IN A QUESTION/ANSWER SYSTEM WHEN ANSWER IS NOT CONTAINED IN CORPUS

BACKGROUND

The present application relates generally to an improved data processing apparatus and method and more specifically to mechanisms for determining the answers to questions input to a Question and Answer (QA) system when the answer is not explicitly provided in the corpus of information operated on by the QA system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for generating an answer for an input question when the answer is not directly present in a corpus of information. The method comprises receiving, in the data processing system, an input question from a computing device and analyzing, by the data processing system, the input question to determine whether the input question is requesting an answer that is calculable. In response to a determination that the input question is requesting an answer that is calculable, the method comprises retrieving, by the data processing system, from a corpus of information, one or more constituent data values for calculating the requested answer to the input question; and calculating a value corresponding to the requested answer based on the one or more retrieved constituent data values. The calculated value is then output as the requested answer to the input question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts a flowchart diagram of one embodiment of a method for question/answer creation for a document;

DETAILED DESCRIPTION

Figure 1:
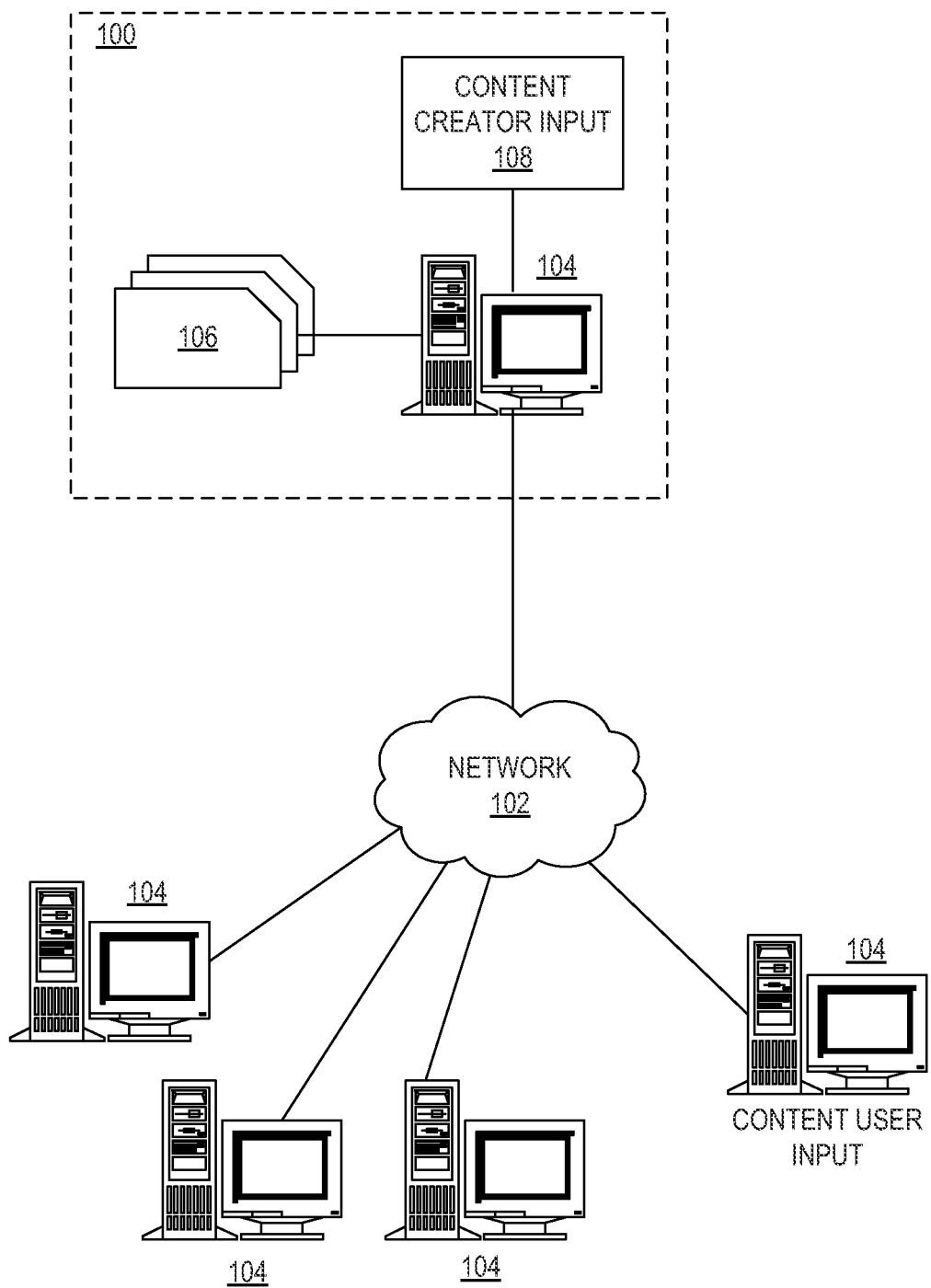
FIG. 1 depicts a schematic diagram of one illustrative embodiment of a question/answer (QA) system in a computer network.

Question and Answer (QA) systems, such as Watson™ and the like, provide answers to input questions by ingesting a large corpus of documentary data, annotating the data, and generally processing the data before-hand to generate structured information from structured and unstructured electronic documents. With a QA system such as Watson™, a question is received, the QA system parses the question and analyzes it to determine what is being asked for, and then performs a search of its ingested data from the corpus to identify candidate answers for the input question, determine confidence scores for the candidate answers based on analysis of evidentiary information, and the like. If the direct answer to the question is not in the ingested corpus, the QA system cannot provide the correct answer for the input question. In these instances, the QA system provides an incorrect answer with a low confidence score. In other words, if the direct answer for the question is not present within the ingested corpus, then the QA system is not useful to answer that question.

In such a situation, the question that cannot be answered may be logged and used as a basis for human intervention to add to the corpus the document data that provides the correct answer for the question. That is, a human analyst must be informed of the lack of information in the corpus, the human analyst must locate the documents that provide the answer to the question and, if necessary, take actions to put the documents into a form that the QA system can ingest, and then cause the QA system to perform ingestion operations, including annotations by one or more annotators, and the like, in order to expand the corpus to include the answer to the input question. This is a time consuming, manual process.

The illustrative embodiments recognize that there are instances where the corpus of information may not directly contain the answer to an input question, however the correct answer can be deduced from the content of the already ingested corpus by performing a calculation based on the information already present in the ingested corpus. The illustrative embodiments provide mechanisms for determining the correct answer for an input question when the direct answer to the input question is not present within the ingested corpus. The illustrative embodiments first identify whether or not the question is asking for an answer that can be generated by performing a calculation. Second, the illustrative embodiments determine if the corpus of information comprises the necessary information to perform the calculation to generate the requested answer. Third, if the corpus comprises the constituent information for performing the calculation, the calculation is performed with the result being returned as the answer to the input question. Thus, even though the direct answer to the input question was itself not present in the already ingested corpus of information, the QA system is able to deduce or generate the correct answer from calculations using the information that is present in the already ingested corpus.

For example, assume that the corpus of information ingested by a QA system includes the 2011 Major League Baseball statistics. Assume then that a baseball related question is submitted to the QA system, such as from a user of a client computing device that enters the question via a user interface which then submits the question to the QA system executing on one or more server computing devices. In this example, assume that the input question is "What was Josh Hamilton's batting average in 2011, in the month of June, in night games?" The QA system would not provide a correct answer with a high confidence since that exact statistic is not in the ingested corpus. However, the information is present in the ingested corpus by which the correct answer may be calculated with a sufficiently high confidence.

In this example, the QA system may parse and analyze the input question and determine that the question is looking for an average, which is an answer that is able to be determined through a mathematical calculation. Furthermore, from the other features extracted from the input question, the QA system gathers the other criteria for calculating the desired answer value, e.g., Josh Hamilton, batting average, 2011, June, night games. From these features extracted from the input question, the QA system may search the ingested corpus of information, i.e. the 2011 Major League Baseball statistics, to retrieve the data necessary to calculate the answer value. In this example, the QA system may generate one or more queries that are applied against the corpus to retrieve Josh Hamilton's at-bat and hit statistics for the month of June in the year 2011, with day games removed from consideration. The resulting data is used to calculate and produce an answer and a confidence score for the calculated answer value. The confidence score is directly related to the confidence in the data collected for the calculation. That is, in this example, the confidence score is based on the confidence in the following collected data: (1) Number of at-bats in night games for June 2011 and (2) Number of hits in night games for June 2011. Thus, in this way, the requested answer is calculated from the data in the corpus of information even though the requested answer does not directly exist in the corpus of information itself.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. FIGS. 1-5 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to calculating answers to questions when the answers to the questions do not directly exist in the corpus of information ingested by the QA system.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-5 are only examples and are not intended to state or imply any limitation with regard to the type of QA mechanisms with which the illustrative embodiments may be implemented. Many modifications to the example QA system shown in FIGS. 1-5 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more content users. Other embodiments of the QA system 100 may be used with components, systems, subsystems, and/or devices other than those that are depicted herein.

The QA system 100 may be configured to receive inputs from various sources. For example, the QA system 100 may receive input from the network 102, a corpus of electronic documents 106 or other data, a content creator 108, content users, and other possible sources of input. In one embodiment, some or all of the inputs to the QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QA system 100 may operate in environments of any size, including local and global, e.g., the Internet.

In one embodiment, the content creator creates content in a document 106 for use as part of a corpus of data with the QA system 100. The document 106 may include any file, text, article, or source of data for use in the QA system 100. Content users may access the QA system 100 via a network connection or an Internet connection to the network 102, and may input questions to the QA system 100 that may be answered by the content in the corpus of data. In one embodiment, the questions may be formed using natural language. The QA system 100 may interpret the question and provide a response to the content user containing one or more answers to the question. In some embodiments, the QA system 100 may provide a response to users in a ranked list of answers.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 2:
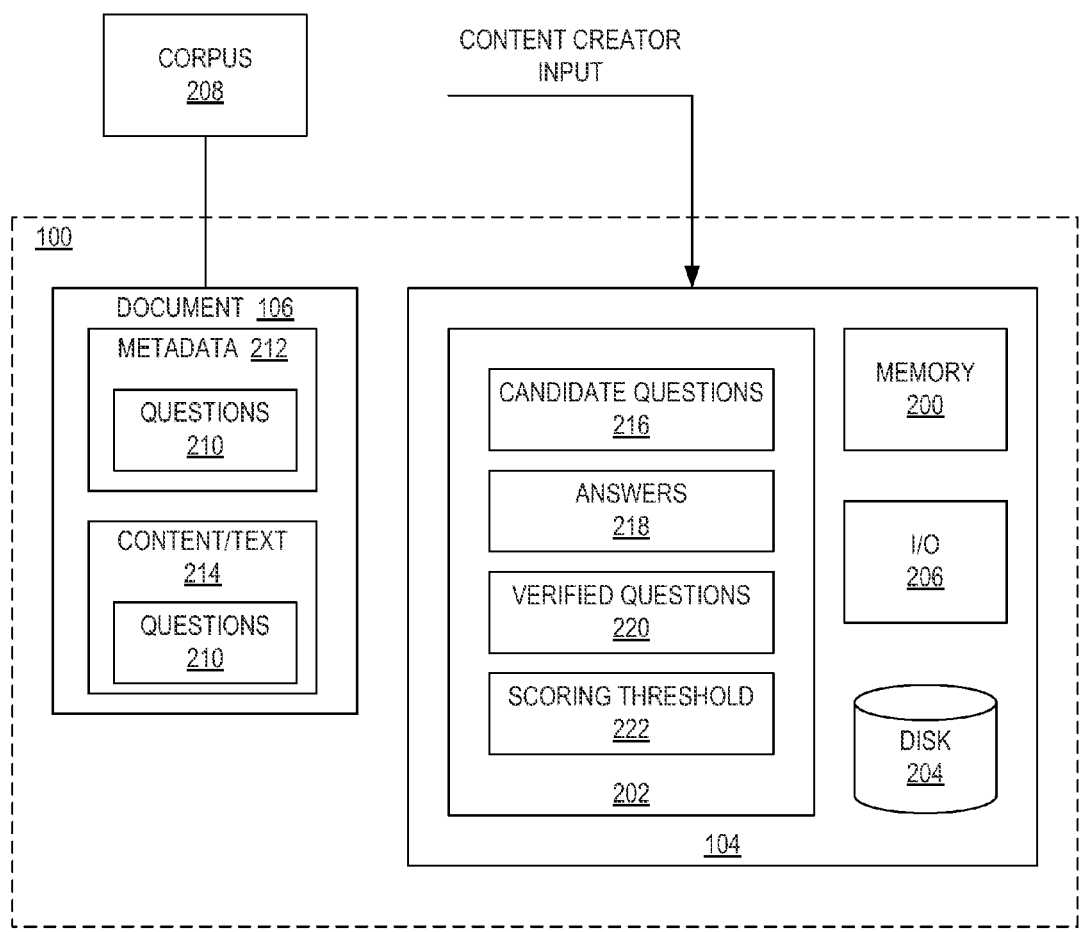
FIG. 2 depicts a schematic diagram of one embodiment of the QA system of FIG. 1.

FIG. 2 depicts a schematic diagram of one embodiment of the QA system 100 of FIG. 1. The depicted QA system 100 includes various components, described in more detail below, that are capable of performing the functions and operations described herein. In one embodiment, at least some of the components of the QA system 100 are implemented in a computer system. For example, the functionality of one or more components of the QA system 100 may be implemented by computer program instructions stored on a computer memory device 200 and executed by a processing device, such as a CPU. The QA system 100 may include other components, such as a disk storage drive 204, and input/output devices 206, and at least one document 106 from a corpus 208. Some or all of the components of the QA system 100 may be stored on a single computing device 104 or on a network of computing devices 104, including a wireless communication network. The QA system 100 may include more or fewer components or subsystems than those depicted herein. In some embodiments, the QA system 100 may be used to implement the methods described herein as depicted in FIG. 4 and may be augmented or configured to implement the additional operations, functionality, and features described hereafter with regard to the illustrative embodiments describes in conjunction with the subsequent figures.

In one embodiment, the QA system 100 includes at least one computing device 104 with a processor 202 for performing the operations described herein in conjunction with the QA system 100. The processor 202 may include a single processing device or multiple processing devices. The processor 202 may have multiple processing devices in different computing devices 104 over a network such that the operations described herein may be performed by one or more computing devices 104. The processor 202 is connected to and in communication with the memory device. In some embodiments, the processor 202 may store and access data on the memory device 200 for performing the operations described herein. The processor 202 may also be connected to a storage disk 204, which may be used for data storage, for example, for storing data from the memory device 200, data used in the operations performed by the processor 202, and software for performing the operations described herein.

In one embodiment, the QA system 100 imports a document 106. The electronic document 106 may be part of a larger corpus 208 of data or content, which may contain electronic documents 106 related to a specific topic or a variety of topics. The corpus 208 of data may include any number of documents 106 and may be stored in any location relative to the QA system 100. The QA system 100 may be capable of importing any of the documents 106 in the corpus 208 of data for processing by the processor 202. The processor 202 may communicate with the memory device 200 to store data while the corpus 208 is being processed.

The document 106 may include a set of questions 210 generated by the content creator at the time the content was created. When the content creator creates the content in the document 106, the content creator may determine one or more questions that may be answered by the content or for specific use cases for the content. The content may be created with the intent to answer specific questions. These questions may be inserted into the content, for example, by inserting the set of questions 210 into the viewable content/text 214 or in metadata 212 associated with the document 106. In some embodiments, the set of questions 210 shown in the viewable text 214 may be displayed in a list in the document 106 so that the content users may easily see specific questions answered by the document 106.

The set of questions 210 created by the content creator at the time the content is created may be detected by the processor 202. The processor 202 may further create one or more candidate questions 216 from the content in the document 106. The candidate questions 216 include questions that are answered by the document 106, but that may not have been entered or contemplated by the content creator. The processor 202 may also attempt to answer the set of questions 210 created by the content creator and candidate questions 216 extracted from the document 106, "extracted" meaning questions that are not explicitly specified by the content creator but are generated based on analysis of the content.

In one embodiment, the processor 202 determines that one or more of the questions are answered by the content of the document 106 and lists or otherwise marks the questions that were answered in the document 106. The QA system 100 may also attempt to provide answers 218 for the candidate questions 216. In one embodiment, the QA system 100 answers 218 the set of questions 210 created by the content creator before creating the candidate questions 216. In another embodiment, the QA system 100 answers 218 the questions and the candidate questions 216 at the same time.

The QA system 100 may score question/answer pairs generated by the system. In such an embodiment, question/answer pairs that meet a scoring threshold are retained, and question/answer pairs that do not meet the scoring threshold 222 are discarded. In one embodiment, the QA system 100 scores the questions and answers separately, such that questions generated by the system 100 that are retained meet a question scoring threshold, and answers found by the system 100 that are retained meet an answer scoring threshold. In another embodiment, each question/answer pair is scored according to a question/answer scoring threshold.

After creating the candidate questions 216, the QA system 100 may present the questions and candidate questions 216 to the content creator for manual user verification. The content creator may verify the questions and candidate questions 216 for accuracy and relatedness to the content of the document 106. The content creator may also verify that the candidate questions 216 are worded properly and are easy to understand. If the questions contain inaccuracies or are not worded properly, the content creator may revise the content accordingly. The questions and candidate questions 216 that have been verified or revised may then be stored in the content of the document 106 as verified questions, either in the viewable text 214 or in the metadata 212 or both.

Figure 3:
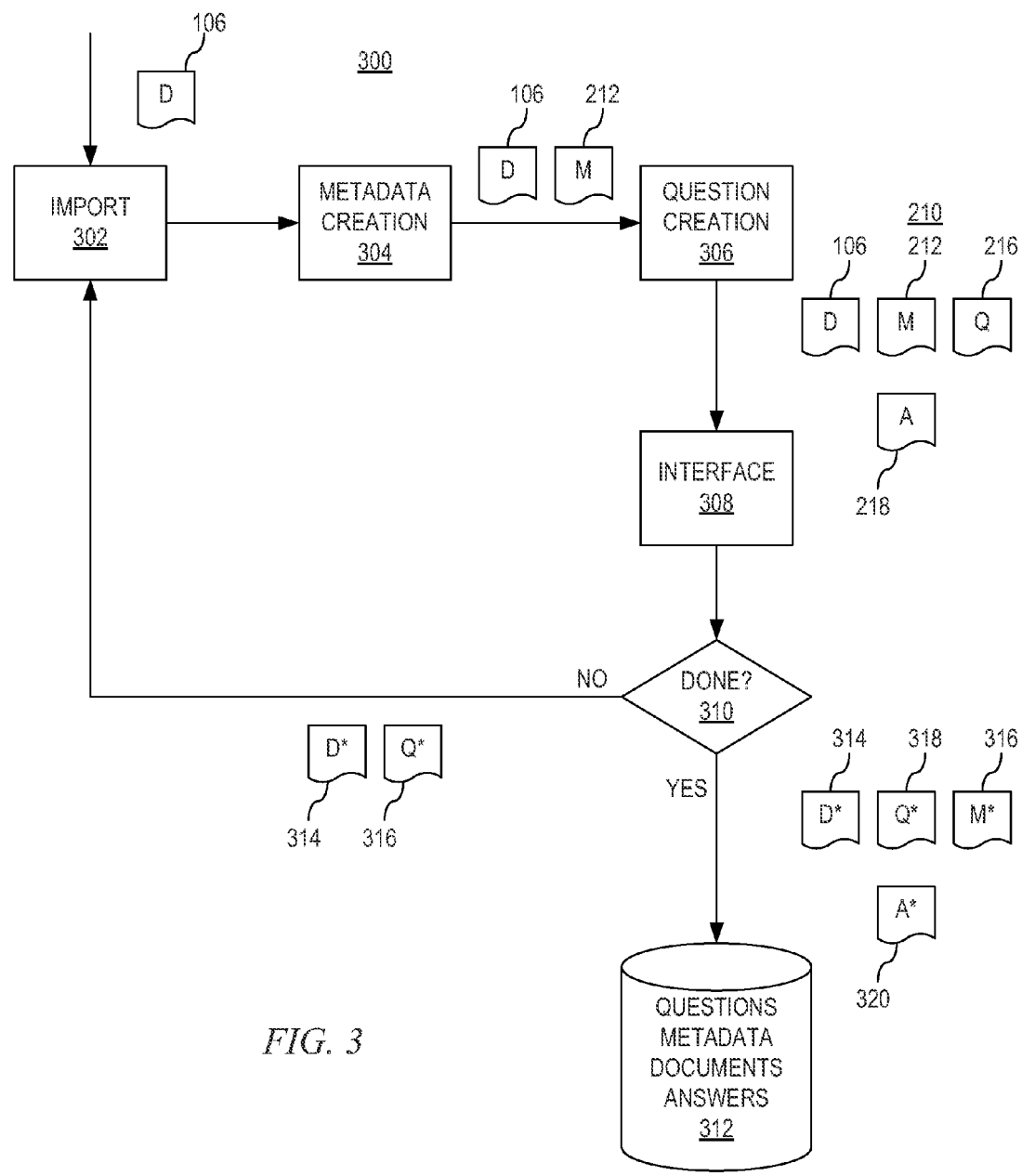
FIG. 3 depicts a flowchart diagram of one embodiment of a method for question/answer creation for a document.

FIG. 3 depicts a flowchart diagram of one embodiment of a method 300 for question/answer creation for a document 106. Although the method 300 is described in conjunction with the QA system 100 of FIG. 1, the method 300 may be used in conjunction with any type of QA system.

In one embodiment, the QA system 100 imports 302 one or more electronic documents 106 from a corpus 208 of data. This may include retrieving the documents 106 from an external source, such as a storage device in a local or remote computing device 104. The documents 106 may be processed so that the QA system 100 is able to interpret the content of each document 106. This may include parsing the content of the documents 106 to identify questions found in the documents 106 and other elements of the content, such as in the metadata associated with the documents 106, questions listed in the content of the documents 106, or the like. The system 100 may parse documents using document markup to identify questions. For example, if documents are in extensible markup language (XML) format, portions of the documents could have XML question tags. In such an embodiment, an XML parser may be used to find appropriate document parts. In another embodiment, the documents are parsed using native language processing (NLP) techniques to find questions. For example, the NLP techniques may include finding sentence boundaries and looking at sentences that end with a question mark or other methods. The QA system 100 may use language processing techniques to parse the documents 106 into sentences and phrases, for example.

In one embodiment, the content creator creates 304 metadata 212 for a document 106, which may contain information related to the document 106, such as file information, search tags, questions created by the content creator, and other information. In some embodiments, metadata 212 may already be stored in the document 106, and the metadata 212 may be modified according to the operations performed by the QA system 100. Because the metadata 212 is stored with the document content, the questions created by the content creator may be searchable via a search engine configured to perform searches on the corpus 208 of data, even though the metadata 212 may not be visible when the document 106 is opened by a content user. Thus, the metadata 212 may include any number of questions that are answered by the content without cluttering the document 106.

The content creator may create 306 more questions based on the content, if applicable. The QA system 100 also generates candidate questions 216 based on the content that may not have been entered by the content creator. The candidate questions 216 may be created using language processing techniques designed to interpret the content of the document 106 and generate the candidate questions 216 so that the candidate questions 216 may be formed using natural language.

When the QA system 100 creates the candidate questions 216 or when the content creator enters questions into the document 106, the QA system 100 may also locate the questions in the content and answer the questions using language processing techniques. In one embodiment, this process includes listing the questions and candidate questions 216 for which the QA system 100 is able to locate answers 218 in the metadata 212. The QA system 100 may also check the corpus 208 of data or another corpus 208 for comparing the questions and candidate questions 216 to other content, which may allow the QA system 100 to determine better ways to form the questions or answers 218. Examples of providing answers to questions from a corpus are described in U.S. Patent Application Publication No. 2009/0287678 and U.S. Patent Application Publication No. 2009/0292687, which are herein incorporated by reference in their entirety.

The questions, candidate questions 216, and answers 218 may then be presented 308 on an interface to the content creator for verification. In some embodiments, the document text and metadata 212 may also be presented for verification. The interface may be configured to receive a manual input from the content creator for user verification of the questions, candidate questions 216, and answers 218. For example, the content creator may look at the list of questions and answers 218 placed in the metadata 212 by the QA system 100 to verify that the questions are paired with the appropriate answers 218, and that the question-answer pairs are found in the content of the document 106. The content creator may also verify that the list of candidate questions 216 and answers 218 placed in the metadata 212 by the QA system 100 are correctly paired, and that the candidate question-answer pairs are found in the content of the document 106. The content creator may also analyze the questions or candidate questions 216 to verify correct punctuation, grammar, terminology, and other characteristics to improve the questions or candidate questions 216 for searching and/or viewing by the content users. In one embodiment, the content creator may revise poorly worded or inaccurate questions and candidate questions 216 or content by adding terms, adding explicit questions or question templates that the content answers 218, adding explicit questions or question templates that the content does not answer, or other revisions. Question templates may be useful in allowing the content creator to create questions for various topics using the same basic format, which may allow for uniformity among the different content. Adding questions that the content does not answer to the document 106 may improve the search accuracy of the QA system 100 by eliminating content from the search results that is not applicable to a specific search.

After the content creator has revised the content, questions, candidate questions 216, and answers 218, the QA system 100 may determine 310 if the content finished being processed. If the QA system 100 determines that the content is finished being processed, the QA system 100 may then store 312 the verified document 314, verified questions 316, verified metadata 318, and verified answers 320 in a data store on which the corpus 208 of data is stored. If the QA system 100 determines that the content is not finished being processed—for example if the QA system 100 determines that additional questions may be used—the QA system 100 may perform some or all of the steps again. In one embodiment, the QA system 100 uses the verified document and/or the verified questions to create new metadata 212. Thus, the content creator or QA system 100 may create additional questions or candidate questions 216, respectively. In one embodiment, the QA system 100 is configured to receive feedback from content users. When the QA system 100 receives feedback from content users, the QA system 100 may report the feedback to the content creator, and the content creator may generate new questions or revise the current questions based on the feedback.

FIG. 4 depicts a flowchart diagram of one embodiment of a method 400 for question/answer creation for a document 106. Although the method 400 is described in conjunction with the QA system 100 of FIG. 1, the method 400 may be used in conjunction with any QA system.

The QA system 100 imports 405 a document 106 having a set of questions 210 based on the content of the document 106. The content may be any content, for example content directed to answering questions about a particular topic or a range of topics. In one embodiment, the content creator lists and categorizes the set of questions 210 at the top of the content or in some other location of the document 106. The categorization may be based on the content of the questions, the style of the questions, or any other categorization technique and may categorize the content based on various established categories such as the role, type of information, tasks described, and the like. The set of questions 210 may be obtained by scanning the viewable content 214 of the document 106 or metadata 212 associated with the document 106. The set of questions 210 may be created by the content creator when the content is created. In one embodiment, the QA system 100 automatically creates 410 at least one suggested or candidate question 216 based on the content in the document 106. The candidate question 216 may be a question that the content creator did not contemplate. The candidate question 216 may be created by processing the content using language processing techniques to parse and interpret the content. The system 100 may detect a pattern in the content of the document 106 that is common for other content in the corpus 208 to which the document 106 belongs, and may create the candidate question 216 based on the pattern.

The QA system 100 also automatically generates 415 answers 218 for the set of questions 210 and the candidate question 216 using the content in the document 106. The QA system 100 may generate the answers 218 for the set of questions 210 and the candidate question 216 at any time after creating the questions and candidate question 216. In some embodiments, the answers 218 for the set of questions 210 may be generated during a different operation than the answer for the candidate question 216. In other embodiments, the answers 218 for both the set of questions 210 and the candidate question 216 may be generated in the same operation.

The QA system 100 then presents 420 the set of questions 210, the candidate question 216, and the answers 218 for the set of questions 210 and the candidate question 216 to the content creator for user verification of accuracy. In one embodiment, the content creator also verifies the questions and candidate questions 216 for applicability to the content of the document 106. The content creator may verify that the content actually contains the information contained in the questions, candidate question 216, and respective answers 218. The content creator may also verify that the answers 218 for the corresponding questions and candidate question 216 contain accurate information. The content creator may also verify that any data in the document 106 or generated by the QA system 100 in conjunction with the QA system 100 is worded properly.

A verified set of questions 220 may then be stored 425 in the document 106. The verified set of questions 220 may include at least one verified question from the set of questions 210 and the candidate question 216. The QA system 100 populates the verified set of questions 220 with questions from the set of questions 210 and candidate questions 216 that are determined by the content creator to be accurate. In one embodiment, any of the questions, candidate questions 216, answers 218, and content that is verified by the content creator is stored in the document 106, for example, in a data store of a database.

The above description illustrates the manner by which content creators may generate metadata for use by a QA system 100 when performing answer generation for input questions. As discussed above, the QA system 100 also is used to answer input questions submitted by users via one or more client computing devices. For example, in a healthcare domain, the QA system 100 may be utilized to receive questions directed to medical issues, such as diagnosis, treatment, and the like. The QA system 100 may process such input questions through a QA system analysis pipeline to evaluate the input question against a corpus of data/information, which may include documents or content having associated metadata as previously described above, unstructured documents, or the like, and generate one or more potential answers to the input question.

Figure 5:
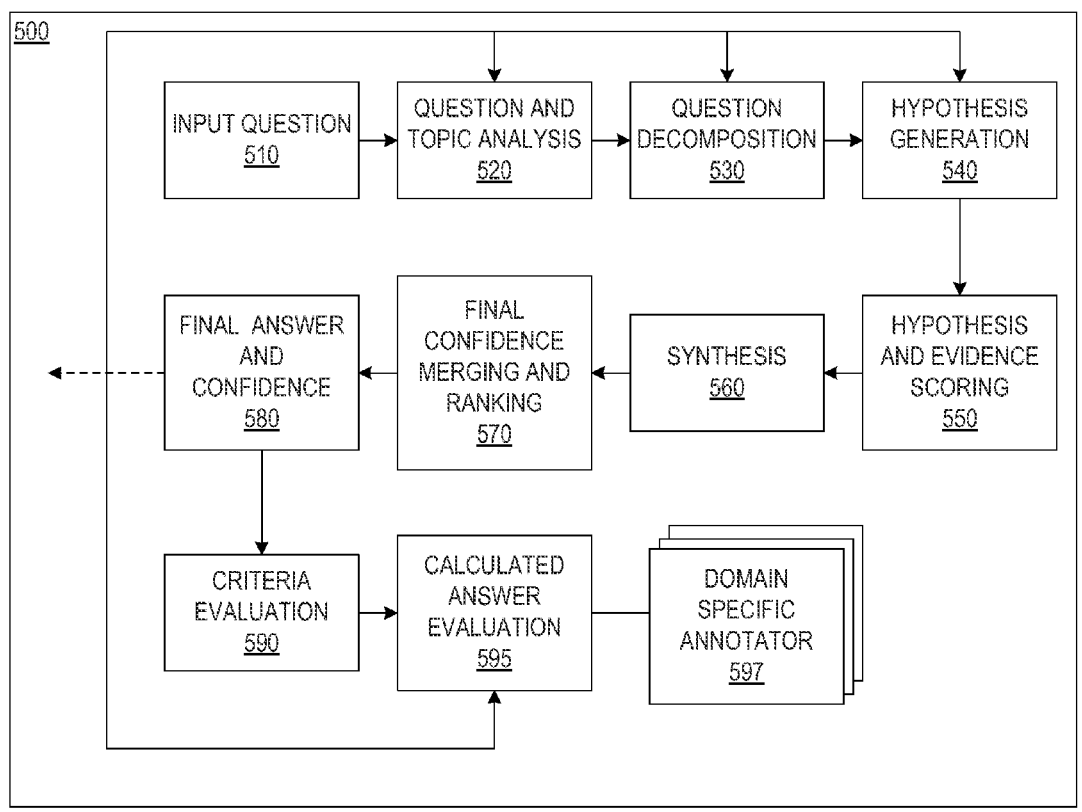
FIG. 5 is an example block diagram of a question and answer system analysis pipeline in accordance with one illustrative embodiment.

FIG. 5 illustrates a QA system pipeline for processing an input question in accordance with one illustrative embodiment. It should be appreciated that the stages of the QA system pipeline shown in FIG. 5 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems.

As shown in FIG. 5, the QA system pipeline 500 comprises a plurality of stages 510-580 through which the QA system operates to analyze an input question and generate a final response. In an initial question input stage 510, the QA system receives an input question that is presented in a natural language format. That is, a user may input, via a user interface, an input question for which the user wishes to obtain an answer, e.g., "Who are Putin's closest advisors?" In response to receiving the input question, the next stage of the QA system pipeline 500, i.e. the question and topic analysis stage 520, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Putin" may be identified as a proper name of a person with which the question is associated, "closest" may be identified as a word indicative of proximity or relationship, and "advisors" may be indicative of a noun or other language topic.

The identified major features may then be used during the question decomposition stage 530 to decompose the question into one or more queries that may be applied to the corpus of data/information in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information. The queries being applied to the corpus of data/information generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA system pipeline 500, in stage 550, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 560, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 570 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, may be generated and output to the submitter of the original input question.

As shown in FIG. 5, in accordance the illustrative embodiments, after stage 580, or as part of stage 580, the set of candidate answers are evaluated against one or more predetermined criteria to determine if any one or more of the candidate answers meets the one or more predetermined criteria. This is shown, for illustrative purposes, as a separate stage 590 in the pipeline 500, but may in fact be integrated with one or more of the other stages, such as stage 580.

For example, the one or more predetermined criteria may comprise a required threshold confidence score that is required for a candidate answer to be considered a valid answer for the input question. That is, the required threshold confidence score specifies a minimum level of confidence that the QA system must have in a candidate answer for the output of the QA system to be considered adequate for answering the input question. If a confidence score associated with a candidate answer equals or exceeds this required threshold confidence score, then the QA system has sufficient confidence that the candidate answer is correct enough to be likely to be a correct answer for the input question. If a confidence score associated with a candidate answer does not equal or exceed the required threshold confidence score, then the QA system does not have sufficient confidence that the candidate answer is correct enough to be likely to be a correct answer for the input question.

If, during the criteria evaluation stage 590, it is determined that none of the candidate answers output at stage 580 have a sufficiently high enough confidence score rating, or otherwise do not satisfy other predetermined criteria evaluated by the criteria evaluation stage 590, then a calculated answer evaluation stage 595 may be invoked that implements logic that interacts with the logic of the question and topic analysis stage 520 to determine if the features extracted from the input question 510 indicate that the answer being sought by the input question 510 is a value that can be calculated. If so, the logic of stage 595 works with the question and topic analysis stage 520 and question decomposition stage 530 to identify the type of answer being sought and to generate one or more queries to be applied against the corpus of information to obtain the constituent information for performing the calculation for generating the answer sought.

Thus, for example, if the input question 510 is not answered to a sufficiently high degree by one or more of the candidate answers generated by the QA system pipeline 500 as evaluated by the criteria evaluation stage 590, the calculated answer evaluation engine 595 may work in conjunction with the question and topic analysis stage 520 to re-evaluate the input question for specific features indicative of a calculated answer being the answer sought by the input question 510. For example, the calculated answer evaluation engine 595 may control the operation of the question and topic analysis stage 520 to analyze the input question looking for various features, such as the terms or phrases "average," "longest," "shortest," "per," "how much," "how little," "biggest," "smallest," "bigger," "smaller," "mean," "median," or other terms or phrases indicative of a calculated value being the answer to the input question.

The calculated answer evaluation engine 595 may implement logic or provide specific annotators 597 configured to identify such terms/phrases or other extractable features from the input question 510 and perform the necessary calculations for generating the calculated value requested by the input question. These specific annotators 597 may be domain specific with the domain being identified by the question and topic analysis stage 520 of the QA system pipeline 500 when parsing and analyzing the input question 510. For example, by parsing the input question 510 and extracting the identifiable features from the input question 510, it can be determined that the input question is directed to sports, baseball, financial services, healthcare, medical diagnosis, legal advice, or any of a plethora of other domains for which the QA system is configured to answer questions. Thus, the specific annotators 597 may comprise sets of annotators 597 where each set may be associated with a different domain and individual annotators 597 in each set may be configured to perform particular types of annotations within the associated domain. Based on the identified domain of the input question 510, a particular set of annotators in the domain specific calculation annotators 597 may be selected for use in analyzing the input question 510.

In addition to identifying whether the input question 510 is looking for a calculated value as the answer to the input question 510, the calculated answer evaluation engine 595 and the associated domain specific calculation annotators 597 may further work in conjunction with the question and topic analysis stage 520 to identify the type of data that is needed to provide to the domain specific calculation annotators 597. That is, the annotators in the question and topic analysis stage 520 and/or the annotators 597 may identify the various extractable features from the input question 510, including the focus, the Lexical Answer Type (LAT), and other features of the input question 510. For example, using the previously mentioned example input question "What was Josh Hamilton's batting average in 2011, in the month of June, in night games?" the focus of the input question may be determined to be the term "what," the LAT is "average", and a clue section (a section of the question that provides information about the type of answer sough, e.g., etymological information, constraints, and the like) is "What was Josh Hamilton's batting." In addition, a person's name, i.e. "Josh Hamilton," a year of "2011", a month of "June", a duration of "night", and a composition of "games" are all features that the annotators of the question and topic analysis stage 520 may extract from the input question through normal operation of the annotators. From these extracted features, it can be determined by the domain specific calculation annotators 597 that in order to answer the input question looking for the calculated value of an "average", the calculation annotators 597 need information about Josh Hamilton, in the year of 2011, in the month of June, and for night games, and specifically batting information.

As a result of the identification of the data needed to generate the requested calculated value, the domain specific calculation annotators 597 may generate one or more queries that are applied against the corpus of information to retrieve the data necessary for performing the calculation required to answer the input question 510. For example, using the previous example above, much of the needed information for answering the question is assumed to be currently provided in the corpus of information and the domain specific calculation annotators 597 include a baseball domain specific calculation annotator that can parse out and identify the baseball related features from the input question that limit the data or otherwise indicate the needed data to calculate the requested answer, i.e. the batting average value requested. For example, through the domain specific parsing and analysis of the input question, after having identified the domain of the input question to be baseball, the baseball domain specific calculation annotator 597 knows that what is sought is a baseball average that is calculated by hits per at-bat and the limiting clauses indicating the required data for calculating this baseball average are a date period (June 1-June 30), a time period (games that start after 6 pm, i.e. at night), and that the data values are to be for the baseball player Josh Hamilton.

From this knowledge, the baseball domain specific calculation annotator 597 may work with the question decomposition stage 530 to generate queries to be applied against the corpus of information to collect the required data for performing the calculation to generate the answer sought by the input question 510. For example, the queries "get(josh hamilton, at-bats, june 1-june 30, 2011, game start>6 pm)" and "get (josh hamilton, hits, june 1-june 30, 2011, game start>6 pm)" may be generated and applied to the corpus of information with the corresponding data in the corpus of information being retrieved. The corresponding retrieved hit data may then divided by at-bats to provide the requested batting average. This calculated batting average may then be used to generate the corresponding hypothesis in hypothesis generation stage 540 and ultimately provided as a candidate answer for the input question 510.

The calculated answer has a corresponding confidence score similar to other candidate answers that were previously generated. The confidence score for the calculated answer is calculated based on the confidence in the various factors used to perform the calculation of the answer. The confidence score may be based on various factors including the document score returned from executing the queries, the page rank or other indicator as to how well a particular returned value matches the query, various other context dependent scoring that identifies how well key features of the input question 510 match a particular data value source with certain conditions that are missing from the data value source being given penalty values or negative weightings, and the like.

Thus, with the mechanisms of the illustrative embodiments, allow for the calculating of answers to input questions from a corpus of information when the answer to the input questions are not specifically or directly present in the corpus of information. The mechanisms of the illustrative embodiments leverage the information that can be extracted from the corpus of information for use as input to a calculation which will then generate the requested answer to the input question based on the information extracted from the corpus of information. In this way, while the input question would typically receive candidate answer results with low confidence scores since the exact answer to the input question is not directly present in the corpus of information, with the mechanisms of the illustrative embodiments, a calculated answer may be generated that has a high confidence value.

The illustrative embodiments ease the need to attempt to ingest every possible answer to every question as is typically required in known QA systems, i.e. if the specific answer to the input question is not directly present in the corpus of information, then the input question cannot be answered with high confidence. The mechanisms of the illustrative embodiments allow QA systems to be smarter when answer input questions and gives them the ability to reason about what is being asked and calculate the correct answer when the direct, correct, answer is not in the ingested corpus of information.

Figure 6:
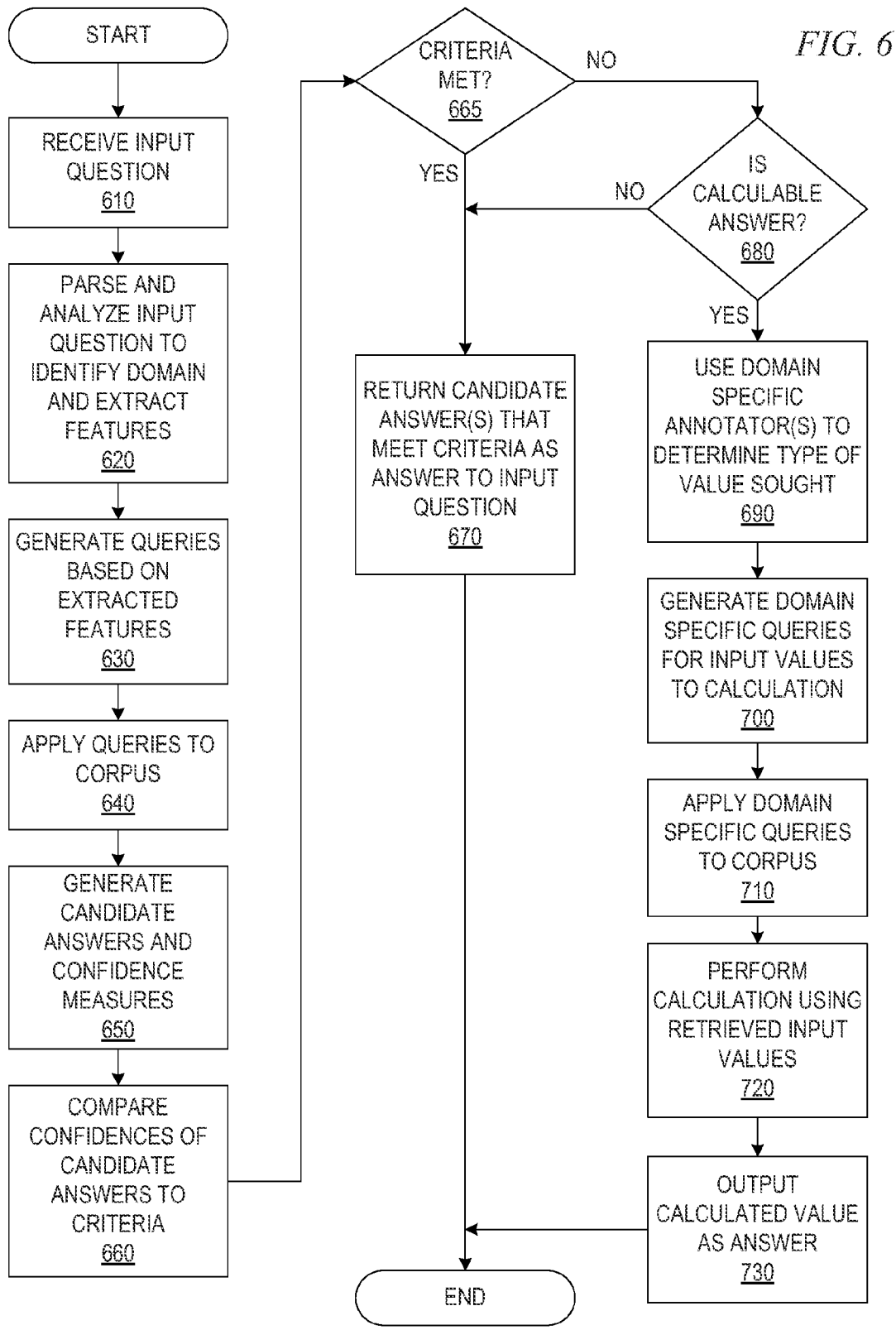
FIG. 6 is a flowchart outlining an example operation for generating a calculated answer for an input question in accordance with one illustrative embodiment.

FIG. 6 is a flowchart outlining an example operation for generating a calculated answer for an input question in accordance with one illustrative embodiment. As shown in FIG. 6, the operation starts by receiving an input question (step 610) which is then parsed and analyzed to identify a domain for the input question and extract features from the input question (step 620). For example, the input question may be parsed and analyzed to identify the focus, lexical answer type, and other characteristics of the input question that may identify the domain of the input question. Having identified the domain of the input question, corresponding annotators for the identified domain may be invoked to extract additional features of the input question based on domain specific knowledge. The extracted features are then used to generate one or more queries (step 630) which are then applied against the corpus of information (step 640) to generate one or more candidate answers and corresponding measures of confidence for the input question (step 650). The measures of confidence may be generated by analyzing evidence passages within the corpus of information that support or detract from a candidate answer being a correct answer for the input question and thus, may add to or subtract from the confidence score for a particular candidate answer.

The confidence measures for the various candidate answers are compared against a predetermined criteria, such as one or more threshold confidence measure values, to determine if at least one candidate answer has a confidence measure meeting or exceeding the predetermined criteria (step 660). If at least one of the candidate answers has a corresponding confidence measure meeting or exceeding the predetermined criteria (step 665), then the candidate answers meeting the predetermined criteria may be returned to a submitter of the input question as potential answers for the input question (step 670) and the operation terminates. Alternatively, an operation may be performed to select a most likely answer to the input question from the candidate answers meeting or exceeding the predetermined criteria and a single final answer may be returned to the submitter of the input question.

If, however, none of the candidate answers have a corresponding confidence measure that meets or exceeds the predetermined criteria in step 665, then the input question is analyzed to determine if the input question is requesting an answer that is a calculable value (step 680). If not, then the operation continues to step 670 where the candidate answers are output but an indicator of the low confidence measures is output as well. Alternatively, an output may be generated that indicates that no answer could be found for the input question since none of the candidate answers have a sufficiently high enough confidence measure.

If the input question is determined to be looking for a calculable value in step 680, then the input question is analyzed by domain specific calculation annotators to identify the type of value being sought by the input question and the constituent data values needed to generate the calculable value (step 690). The domain specific calculation annotators are then used to generate one or more domain specific queries for retrieving input values for the calculation from the corpus of information (step 700) and the one or more domain specific queries are applied to the corpus to retrieve the input values for the calculation (step 710). The calculation is then performed to generate the calculable value requested by the input question and a confidence value for the resulting value is generated based on the confidence values associated with the constituent input values (step 720). The resulting value and its confidence value are then output to the submitter of the input question as the candidate answer for the input question (step 730) and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for generating an answer for an input question when the answer is not directly present in a corpus of information, the method comprising:

receiving, in the data processing system, an input question from a computing device;

processing, by the data processing system, the input question to generate a first set of candidate answers to the input question and corresponding confidence scores for each candidate answer in the first set of candidate answers;

determining, by the data processing system, whether at least one of the candidate answers in the first set of candidate answers has a corresponding confidence score equaling or exceeding a minimum confidence score value, wherein the answer to the input question is determined to not be directly provided in the corpus of information with a predetermined level of confidence if none of the candidate answers in the first set of candidate answers has a corresponding confidence score equaling or exceeding the minimum confidence score value; and in response to the answer to the input question not being directly provided in the corpus of information with the predetermined level of confidence:

analyzing, by the data processing system, the input question to determine whether the input question is requesting an answer that is calculable at least by:

determining a domain of the input question, wherein the domain indicates a subject matter area context of the input question, and wherein the domain is one of a plurality of domains for which input questions are received by the data processing system; and invoking one or more domain specific annotators, corresponding to the determined domain, to analyze the input question, wherein the one or more domain specific annotators are configured to identify domain specific terms or phrases, specific to the determined domain of the input question, which are indicative of the answer being calculable; and in response to a determination that the input question is requesting an answer that is calculable:

retrieving, by the data processing system, from a corpus of information, one or more constituent data values for calculating the requested answer to the input question;

calculating a value corresponding to the requested answer based on the one or more retrieved constituent data values; and outputting, by the data processing system, the calculated value as the requested answer to the input question, wherein calculating the value corresponding to the requested answer comprises invoking the one or more domain specific annotators to perform domain specific calculations to generate domain specific calculable values that are specific to the determined domain of the input question, and wherein different domains are associated with different sets of domain specific terms or phrases and domain specific calculable values.

2. The method of claim 1, wherein analyzing the input question comprises:

performing natural language processing on the input question to extract one or more features from the input question; and analyzing the one or more extracted features to identify the one or more constituent data values.

3. The method of claim 2, wherein retrieving, from a corpus of information, the one or more constituent data values for calculating the requested answer to the input question comprises:

applying, by the data processing system, one or more queries to the corpus of information, based on the extracted one or more features, to retrieve the one or more constituent data values.

4. The method of claim 2, further comprising:

calculating a confidence score associated with the calculated value, wherein the confidence score for the calculated value is a function of confidence values associated with the one or more constituent data values.

5. The method of claim 1, wherein analyzing the input question to determine whether the input question is requesting an answer that is calculable comprises analyzing the input question to identify one or more predetermined terms or phrases corresponding to a mathematically generated value.

6. The method of claim 5, wherein the one or more predetermined terms or phrases comprises at least one of the terms average, longest, shortest, per, how much, how little, biggest, smallest, bigger, smaller, mean, or median.

7. A computer program product comprising a computer readable storage medium having a computer readable program stored therein, wherein the computer readable program, when executed on a data processing system, causes the data processing system to:

receive an input question from a computing device;

process the input question to generate a first set of candidate answers to the input question and corresponding confidence scores for each candidate answer in the first set of candidate answers;

determine whether at least one of the candidate answers in the first set of candidate answers has a corresponding confidence score equaling or exceeding a minimum confidence score value, wherein the answer to the input question is determined to not be directly provided in the corpus of information with a predetermined level of confidence if none of the candidate answers in the first set of candidate answers has a corresponding confidence score equaling or exceeding the minimum confidence score value; and in response to the answer to the input question not being directly provided in the corpus of information with the predetermined level of confidence:

analyze the input question to determine whether the input question is requesting an answer that is calculable at least by:

determining a domain of the input question, wherein the domain indicates a subject matter area context of the input question, and wherein the domain is one of a plurality of domains for which input questions are received by the data processing system; and invoking one or more domain specific annotators, corresponding to the determined domain, to analyze the input question, wherein the one or more domain specific annotators are configured to identify domain specific terms or phrases, specific to the determined domain of the input question, which are indicative of the answer being calculable; and in response to a determination that the input question is requesting an answer that is calculable:

retrieve, from a corpus of information, one or more constituent data values for calculating the requested answer to the input question;

calculate a value corresponding to the requested answer based on the one or more retrieved constituent data values; and output the calculated value as the requested answer to the input question, wherein the computer readable program causes the data processing system to calculate the value corresponding to the requested answer at least by invoking the one or more domain specific annotators to perform domain specific calculations to generate domain specific calculable values that are specific to the determined domain of the input question, and wherein different domains are associated with different sets of domain specific terms or phrases and domain specific calculable values.

8. The computer program product of claim 7, wherein the computer readable program further causes the data processing system to analyze the input question at least by:

performing natural language processing on the input question to extract one or more features from the input question; and analyzing the one or more extracted features to identify the one or more constituent data values.

9. The computer program product of claim 8, wherein the computer readable program further causes the data processing system to retrieve, from a corpus of information, the one or more constituent data values for calculating the requested answer to the input question at least by:

applying, by the data processing system, one or more queries to the corpus of information, based on the extracted one or more features, to retrieve the one or more constituent data values.

10. The computer program product of claim 8, wherein the computer readable program further causes the data processing system to:

calculate a confidence score associated with the calculated value, wherein the confidence score for the calculated value is a function of confidence values associated with the one or more constituent data values.

11. The computer program product of claim 7, wherein the computer readable program further causes the data processing system to analyze the input question to determine whether the input question is requesting an answer that is calculable at least by analyzing the input question to identify one or more predetermined terms or phrases corresponding to a mathematically generated value.

12. An apparatus comprising:

a processor; and a memory coupled to the processor, wherein the memory comprises instructions which, when executed by the processor, cause the processor to:

receive an input question from a computing device;

process the input question to generate a first set of candidate answers to the input question and corresponding confidence scores for each candidate answer in the first set of candidate answers;

determine whether at least one of the candidate answers in the first set of candidate answers has a corresponding confidence score equaling or exceeding a minimum confidence score value, wherein the answer to the input question is determined to not be directly provided in the corpus of information with a predetermined level of confidence if none of the candidate answers in the first set of candidate answers has a corresponding confidence score equaling or exceeding the minimum confidence score value; and in response to the answer to the input question not being directly provided in the corpus of information with the predetermined level of confidence:

analyze the input question to determine whether the input question is requesting an answer that is calculable at least by:

determining a domain of the input question, wherein the domain indicates a subject matter area context of the input question, and wherein the domain is one of a plurality of domains for which input questions are received by the data processing system; and invoking one or more domain specific annotators, corresponding to the determined domain, to analyze the input question, wherein the one or more domain specific annotators are configured to identify domain specific terms or phrases, specific to the determined domain of the input question, which are indicative of the answer being calculable; and in response to a determination that the input question is requesting an answer that is calculable:

retrieve, from a corpus of information, one or more constituent data values for calculating the requested answer to the input question;

calculate a value corresponding to the requested answer based on the one or more retrieved constituent data values; and output the calculated value as the requested answer to the input question, wherein the instructions cause the processor to calculate the value corresponding to the requested answer at least by invoking the one or more domain specific annotators to perform domain specific calculations to generate domain specific calculable values that are specific to the determined domain of the input question, and wherein different domains are associated with different sets of domain specific terms or phrases and domain specific calculable values.

* * * * *